(12) United States Patent
Yamamoto

(10) Patent No.: US 7,360,956 B2
(45) Date of Patent: Apr. 22, 2008

(54) CAMERA WITH STRAP THROUGH HOLE IN PROTRUDING AREA OF OBJECT SIDE SURFACE

(75) Inventor: Jiro Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 11/191,812

(22) Filed: Jul. 28, 2005

(65) Prior Publication Data

US 2006/0024045 A1 Feb. 2, 2006

(30) Foreign Application Priority Data

Jul. 29, 2004 (JP) .............................. 2004-221117

(51) Int. Cl.
*G03B 17/00* (2006.01)

(52) U.S. Cl. ........................ 396/423; 224/267; 224/908

(58) Field of Classification Search ................ 396/423; 224/267, 908
See application file for complete search history.

(56) References Cited

U.S. PATENT DOCUMENTS

| 3,602,118 | A | * | 8/1971 | Oberheim | .................... 396/448 |
| 3,938,166 | A | * | 2/1976 | Sloop | .......................... 396/423 |
| 4,247,028 | A | * | 1/1981 | Maitani et al. | .............. 224/267 |
| 4,348,095 | A | * | 9/1982 | Suzuki et al. | ................ 396/539 |
| 5,115,264 | A | * | 5/1992 | Schappler | .................... 396/423 |
| 5,680,977 | A | * | 10/1997 | Burke | ......................... 224/576 |
| 5,805,944 | A | * | 9/1998 | Barclay et al. | ............. 396/422 |
| 6,217,095 | B1 | * | 4/2001 | Yamada | ...................... 294/149 |

* cited by examiner

*Primary Examiner*—W. B. Perkey
*Assistant Examiner*—Warren K Fenwick
(74) *Attorney, Agent, or Firm*—Cowan, Liebowitz & Latman, P.C.

(57) ABSTRACT

A camera is disclosed, to which a strap can be attached without reducing the space inside the camera body. The camera comprises a first exterior member, which constitutes an object side surface of a camera body. A first area of the first exterior member protrudes with respect to other areas of the first exterior member to constitute a grip portion. An attachment portion to which the strap is attached is provided in the first area.

3 Claims, 4 Drawing Sheets

PRIOR ART

CAMERA WITH STRAP THROUGH HOLE IN PROTRUDING AREA OF OBJECT SIDE SURFACE

FIELD OF THE INVENTION

The present invention relates to a camera having a grip portion and a strap-attachment portion.

BACKGROUND OF THE INVENTION

A photographer can use a film camera, digital camera or video camcorder in his/her hand. Therefore, a camera has been disclosed in Japanese Patent Laid-Open Publication, which has a hand strap for connecting the camera with a photographer's wrist, a neck strap or shoulder strap for dangling the camera from a photographer's neck or shoulder so that the camera may not be accidentally dropped on the ground and destroyed by slipping out of his/her hand.

The configuration of a conventional camera for attaching the hand strap, neck strap or shoulder strap (hereinafter, they are referred to as a "strap") is as follows.

The description will be given of the configuration of the strap-attachment portion in the conventional camera with reference to FIGS. 4 and 5. FIG. 4 is a rear view of a digital camera having the strap-attachment portion, and FIG. 5 is a sectional view of the strap-attachment portion shown in FIG. 4.

In FIG. 4, reference numeral 41 denotes a strap-attachment portion having a through hole. A strap is attached to the camera by lacing the string of the strap through the hole of the strap-attachment portion 41.

Reference numeral 42 denotes a liquid crystal display. The photographer can take images while watching an object image displayed on the liquid crystal display 42. Further, since the liquid crystal display 42 displays taken images stored in a recording medium, not shown in the figure, the photographer can check the taken images.

Reference numeral 43 denotes a plurality of operation members. It is possible to set a flash mode, a drive mode, an image size and an AF mode or enlarge the taken images displayed on the liquid crystal display 42 by operating these operation members 43.

Reference numeral 44 denotes a cover member, which covers a recording-medium slot into which the recording medium is detachably installed. The cover member 44 is swingablly attached to the camera body.

In the conventional camera, it was required to form the through hole-like opening in the camera body for providing the strap attachment portion on the camera body as shown in FIG. 5. Accordingly, the strap attachment portion requires a large space inside the camera body.

Furthermore, a camera has been disclosed, in which a strap-attachment portion having a convex shape is provided on an exterior member made of a resin, as shown in FIG. 6.

However, to provide the strap-attachment portion having the through hole on the exterior member of the camera as shown in FIG. 5, it is necessary to increase the thickness of that portion of the exterior member. Therefore, the part of the exterior member, which corresponds to the strap-attachment portion, protrudes inside the camera body greater than other parts, thereby reducing the space inside the camera body. As a result, it becomes necessary to form a built-in electric circuit board having a shape for preventing the interference to the exterior member, thereby impeding the miniaturization of the camera and reducing the design freedom of interior parts of the camera.

In addition, as for the camera shown in FIG. 6, with consideration of drop of the camera and pull of the strap, it is necessary to form the strap-attachment portion 61 as an individual member made of die-casting zinc or aluminum, which is different from the exterior member. Therefore, the attachment structure for fixing the strap-attachment portion to the camera body becomes complex, thereby increasing the cost.

BRIEF SUMMARY OF THE INVENTION

An object of the present invention is to provide a camera to which a strap can be attached without reducing the space inside the camera body.

According to an aspect, the present invention provides a camera comprising a first exterior member, which constitutes an object side surface of a camera body, a first area of the first exterior member protruding with respect to other areas of the first exterior member to constitute a grip portion. An attachment portion to which a strap is attached is provided in the first area.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Figure 1:
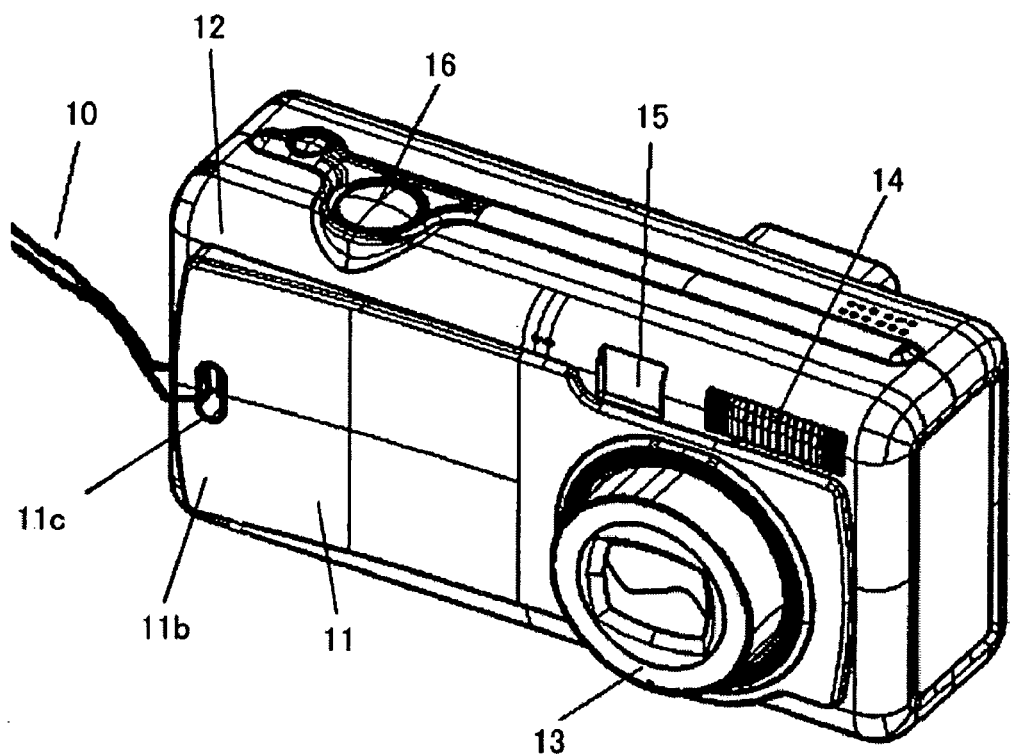
FIG. 1 is a perspective view of a camera which is an embodiment of the present invention.
Figure 2:
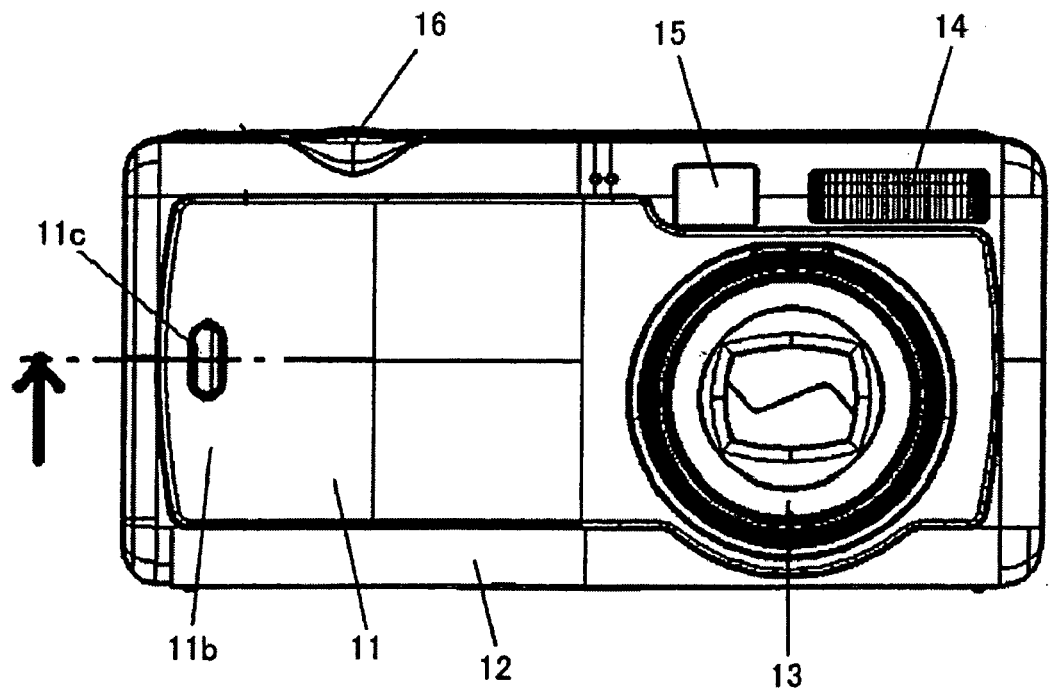
FIG. 2 is a front view of the camera of the embodiment.
Figure 3:
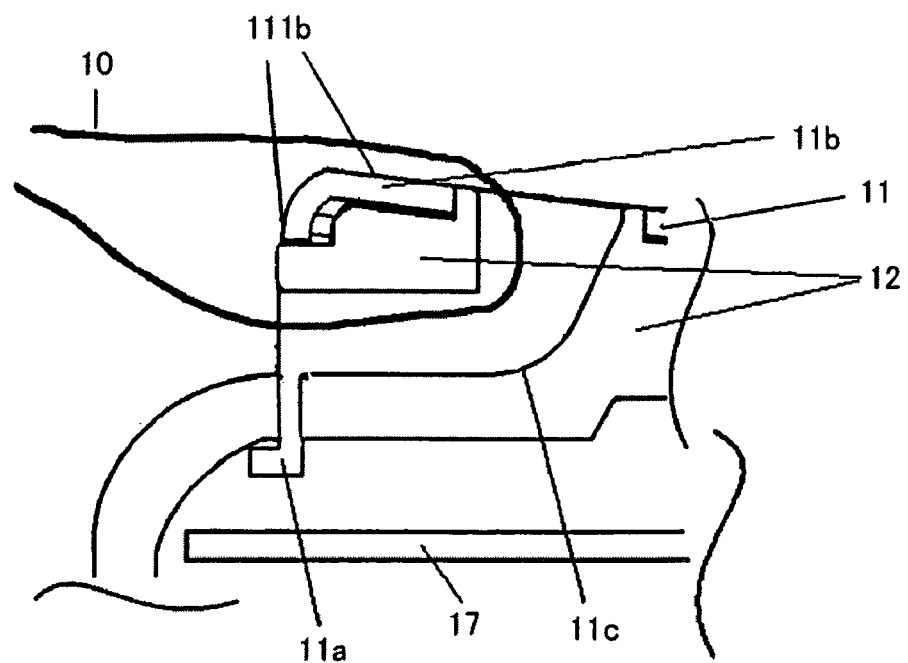
FIG. 3 is a sectional view of a strap-attachment portion in the embodiment.
Figure 4:
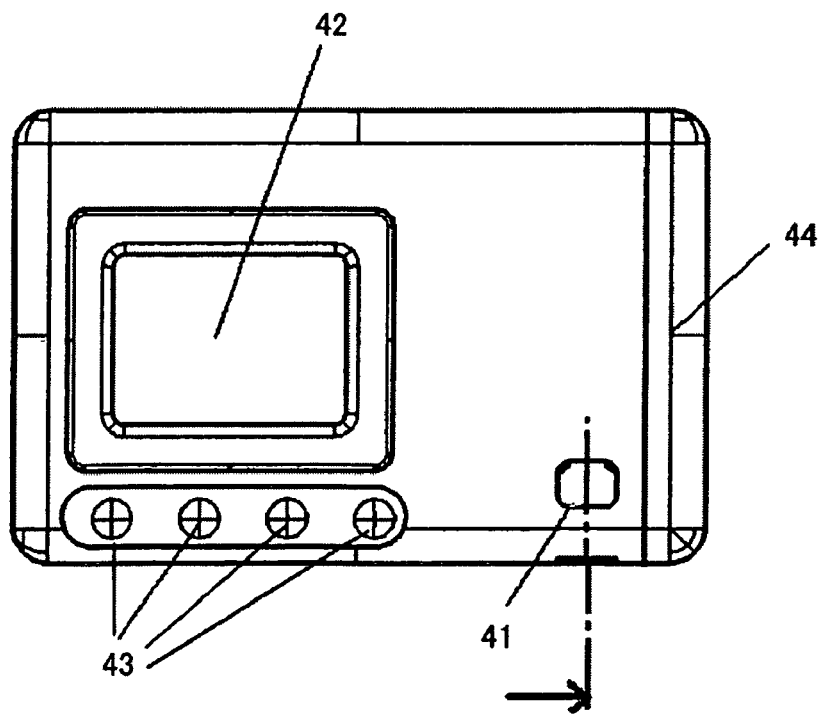
FIG. 4 is a rear view of a conventional camera.
Figure 5:
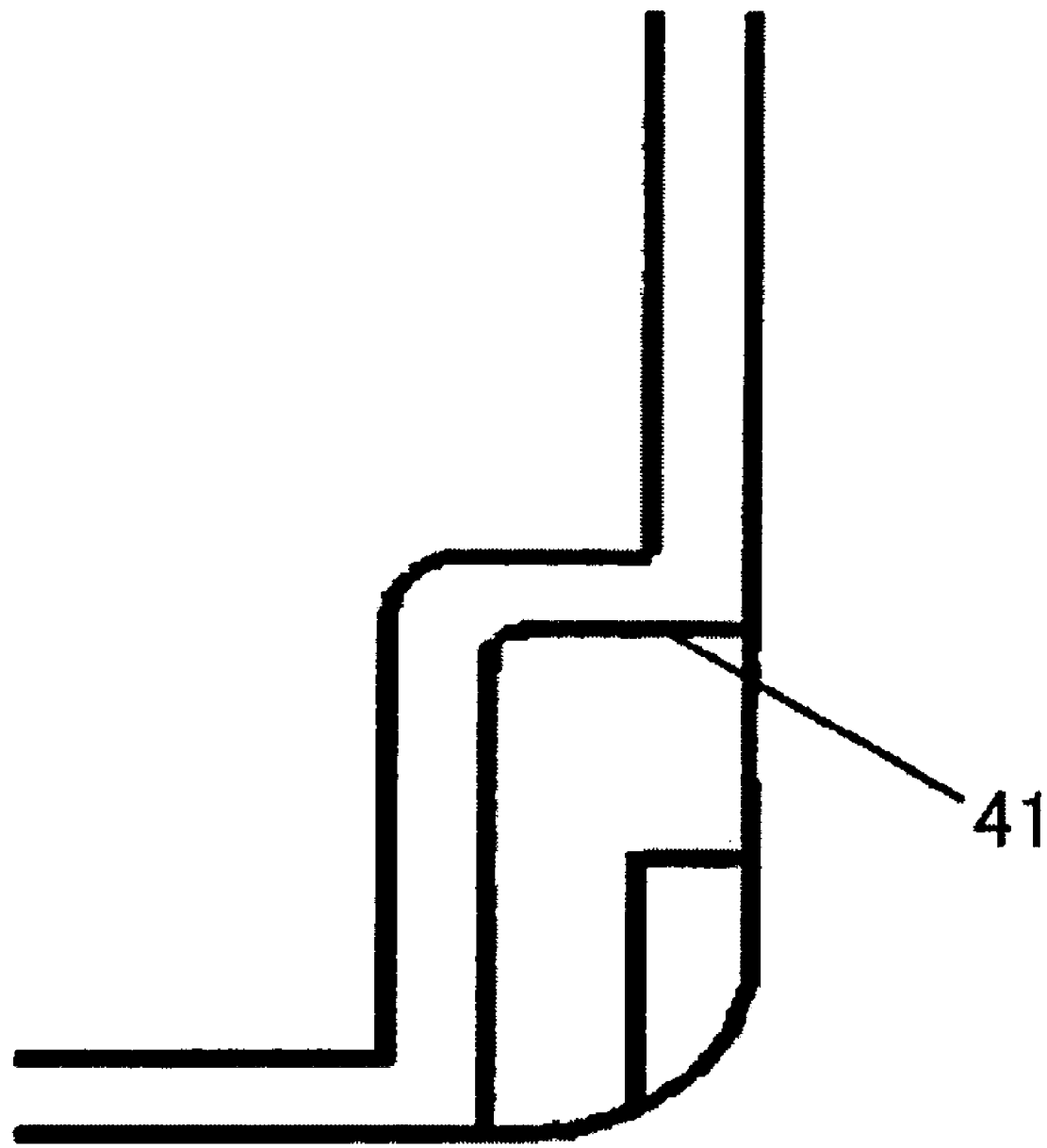
FIG. 5 is a sectional view of a strap-attachment portion of the conventional camera.
Figure 6:
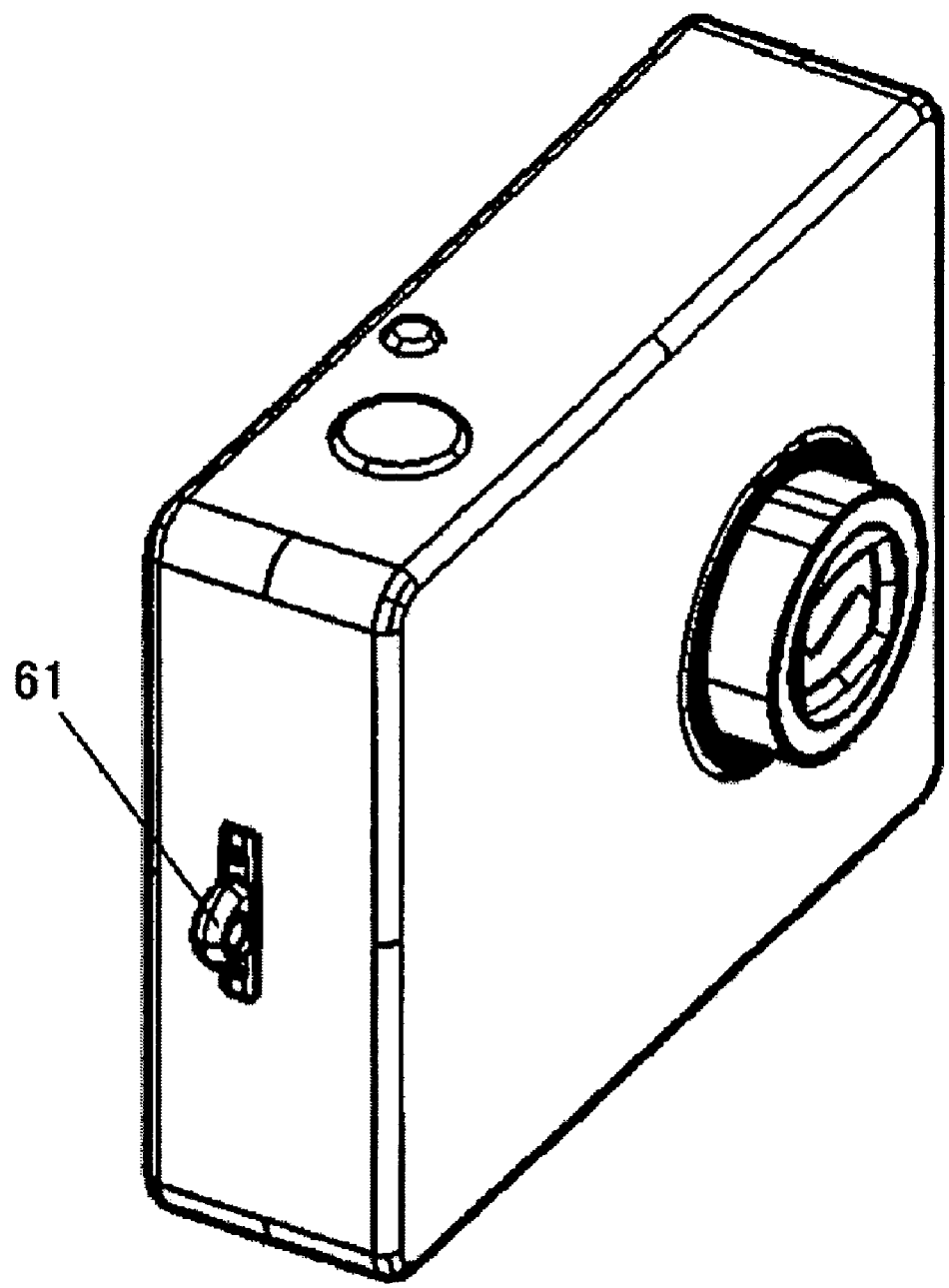
FIG. 6 is a perspective view of the conventional camera.

FIGS. 1 to 3 shows a digital camera which is an embodiment of the present invention. FIG. 1 is a perspective view of the digital camera, FIG. 2 is a front view of the digital camera, and FIG. 3 is a sectional view of a strap-attachment portion in the embodiment.

In FIG. 1, reference numeral 10 denotes a strap that is attached to the after-mentioned strap-opening portion 11c. Putting a photographer's wrist through the strap 10 prevents the camera from dropping on the ground.

Reference numeral 11 denotes a first front exterior member (first exterior member) constituting the exterior of the camera. On the backside of the first front exterior member 11, an engaging protrusion 11a having a hook-like shape is formed. The engaging protrusion 11a engages with the back surface of a second front exterior member (second exterior member) 12.

The first front exterior member 11 is fixed to the second front exterior member 12 by the engagement of the engaging protrusion 11a with the second front exterior member 12, thereby constituting the front exterior of the camera. According to the above-described configuration, a screw clamp is not required for coupling the first and second front exterior members 11 and 12, and a structure resistant to pull of the strap 10 is achieved.

The first and second front exterior members 11 and 12 are made of metal and resin, respectively. The mechanical strength of the first front exterior member 11 is larger than that of the second front exterior member 12.

On the left side of the first front exterior member 11 when viewed from the front, a protruding portion (first area) 11b protruding to the object side is formed. The photographer can put his/her finger on the protruding portion 11b when gripping the camera, thereby increasing the grip performance.

Further, a strap-opening 11c through which the strap 10 is put is formed on the protruding portion 11b. The strap-opening 11c is provided inside from the outer surface of the camera body when vied from the optical axis direction as shown in FIG. 2. Since the strap-opening 11c does not protrude outside the camera body in the present embodiment, it is possible to remove an excrescent protrusion that the conventional camera has.

Reference numeral 13 denotes a lens barrel, which moves between a house position where the lens barrel 13 is housed in the camera body and not used for image-taking, and an image-taking position where the lens barrel 13 protrudes from the front surface of the camera body. Light entering from the lens barrel 13 forms an image on the light-receiving surface of an image-pickup device such as a CCD sensor or a CMOS sensor (not shown in the figure), and photoelectrically converted into an image signal. The image signal is output from the image-pickup device, and recorded to a recording medium (not shown in the figure).

Reference numeral 14 denotes a flash unit, which is built on the second front exterior member 12, the flash unit irradiating flashlight to the object at the time of image-taking. Reference numeral 15 denotes an optical viewfinder provided in the left of the flash unit 14, the optical viewfinder being used for observing the object by the photographer.

Reference numeral 16 denotes a release button. An image-taking preparation operation such as a photometry operation and a focus detection operation is started according to a first stroke operation of the release button 16. An image-taking operation such as an exposure operation of the image-pickup device and a recording operation in which the output from the image-pickup device is recorded to the recording medium is started according to a second stroke operation of the release button 16.

Next, the detailed description will be given of the strap-opening 11c with reference to FIGS. 2 and 3. The strap-opening 11c is formed in the left portion of the first front exterior member 11 when viewed from the front, and has an L-shaped cross section when viewed from the top as shown in FIG. 3. The second front exterior member 12 is attached to the back surface (surface facing inward) of the first front exterior member 11.

As described above, in the present embodiment, since the strap-opening 11c is provided on the outside of the second front exterior member 12, it is not necessary to consider the interference of the strap-opening 11c to the electric circuit board 17 provided in the camera body. As a result, the design freedom is increased, thereby making it possible to miniaturizing the camera.

Furthermore, since the strap-opening 11c is provided on the protruding portion 11b, which functions as the grip portion, of the first front exterior member 11 constituting the front exterior of the camera, it is possible to provide two functions to the first front exterior member 11 as one member.

In addition, the strap-opening 11c is formed inside the outer surface 111b of the protruding portion 11b as shown in FIG. 3, it is possible to remove an excrescent protrusion which the conventional camera has.

An attachment portion for the strap 10 may be provided by forming a convex portion having a strap-opening on the left end of the first front exterior member 11 when viewed from the front.

As described above, according to the present invention, it is possible to provide two functions of being a grip portion and a strap-attachment portion to the first front exterior member 11. Further, since the strap-attachment portion is provided on the first front exterior member 11, it is not necessary to consider the interference of the strap-attachment portion to parts provided inside the camera. Therefore, the design freedom is increased, thereby making it possible to miniaturizing the camera.

This application claims foreign priority benefits based on Japanese Patent Application No. 2004-221117, filed on Jul. 29, 2004, which is hereby incorporated by reference herein in its entirety as if fully set forth herein.

What is claimed is:

1. A camera comprising:
   a camera body;
   a first exterior member, which constitutes an object side surface of the camera body; and
   a second exterior member, which holds the first exterior member,
   wherein a first area of the first exterior member protrudes with respect to the second exterior member on an object side to form a grip portion, and
   wherein a through hole to which a strap is attached is provided at an end of the first area.

2. The camera according to claim 1, wherein the through hole is provided inside the outer surface of the second exterior member when viewed from an image-taking-optical-axis direction.

3. The camera according to claim 1, wherein the first exterior member has a higher mechanical strength than that of the second exterior member.

* * * * *

UNITED STATES PATENT AND TRADEMARK OFFICE
CERTIFICATE OF CORRECTION

| | |
|---|---|
| PATENT NO. | : 7,360,956 B2 |
| APPLICATION NO. | : 11/191812 |
| DATED | : April 22, 2008 |
| INVENTOR(S) | : Jiro Yamamoto |

It is certified that error appears in the above-identified patent and that said Letters Patent is hereby corrected as shown below:

Title Page, item (75) Inventor:, delete "Jiro Yamamoto, Kawasaki (JP)" and insert -- Jiro Yamamoto, Kanagawa-ken (JP) --

Signed and Sealed this

Ninth Day of September, 2008

JON W. DUDAS
*Director of the United States Patent and Trademark Office*